Patented May 19, 1942

2,283,294

UNITED STATES PATENT OFFICE 2,283,294

AZO DYESTUFFS AND PROCESS OF PREPARING SAME

Fritz Straub, Kaiser-Augst, near Basel, Peter Pieth and Walter Anderau, Basel, and Walter Hanhart, Riehen, Switzerland, assignors to Society of Chemical Industry in Basle, Basel, Switzerland No Drawing. Application August 8, 1939, Serial No. 289,038. In Switzerland August 16, 1938

17 Claims. (Cl. 260—143)

This invention relates to the manufacture of valuable new tris- and poly-azo-dyestuffs, comprising using in the construction of the dyestuff at least one binuclear component that contains the atomic grouping

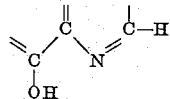

characteristic of 8-hydroxyquinoline; if desired the dyestuff thus obtained is treated with an agent yielding metal.

For making such dyestuffs a first component may be diazotized and coupled with a middle component, the azo-dyestuff thus obtained being further diazotized, coupled once more with a middle component and then after further diazotization coupled with an end component.

In this procedure there is preferably used as the first component a diazo compound of the benzene or naphthalene series; such are for example sulfonic acids of aniline or a homologue or substitution product thereof, aminocarboxylic acids, for instance anthranilic acid or aminosalicylic acid, 1- and 2-aminonaphthalene-sulfonic acids, for instance 1-aminonaphthalene-4- or 5-sulfonic acid, 2-aminonaphthalene-4:8 or 6:8-disulfonic acid, O-esters of 1:8-aminonaphthol-sulfonic acids or the like. As middle components there may be used aniline (in the form of the so-called aniline-ω-methane-sulfonic acid), meta-toluidine, cresidine, 1-amino-2:5-dialkoxy-benzene, 5-amino-8-hydroxyquinoline, 1-aminonaphthalene, 1-aminonaphthalene-6- or 7-sulfonic acid, 1-amino-2-alkoxy-naphthalenes such as 1-amino-2-methoxy- and 2-ethoxy-naphthalene and its 6- or 7-sulfonic acid or the like. As end components there are used those binuclear compounds which have the atomic grouping named above characteristic of 8-hydroxy-quinoline, for example 8-hydroxyquinoline itself or a substitution product thereof, for instance an 8-hydroxyquinoline containing as a substituent halogen or a sulfonic acid group. There may also be used as first components 8-hydroxyquinolines containing as substituents amino-groups and if desired further groups. It is not however necessary to use the 8-hydroxyquinoline as third component. If the trisazo-dyestuff contains groups capable of being diazotized or groups which are capable of conversion into diazotizable groups which, if desired after conversion into amino groups, may be diazotized, such a diazo-trisazo-compound may be coupled with the compound containing the 8-hydroxyquinoline grouping. This is the case for example when there has been used as third component 2-amino-5- or 8-hydroxynaphthalene-7- or 6-sulfonic acid or as the first component para-nitraniline, para-nitraniline-ortho-sulfonic acid, acetyl-paraphenylenediamine or 1-amino-4-acetyl-aminonaphthalene-6-sulfonic acid.

The dyestuffs in question may also be made by coupling a tetrazo-compound, for example 4:4'-tetrazodiphenyl, 3:3'-dimethyl-4:4'-tetrazodiphenyl, 3:3'-dimethoxy-4:4'-tetrazodiphenyl or the like, preferably 4:4'-tetrazodiphenyl substituted in 3- or 3'-position first with 1 or 2 mol of the suitable middle component, for example 1-naphthylamine-6- or 7-sulfonic acid or 2-amino-5- or 8-hydroxynaphthalene-7- or 6-sulfonic acid and then coupling the dyestuff thus obtained after diazotization or tetrazotization with 2 mols of an azo-component, at least one mol of a hydroxyquinoline compound as defined above being used. In the manufacture of dyestuffs of this type it is obvious that the sequence of the operations may be varied. Advantageously tetrazo compounds as described above may be coupled on the one hand with coupling components containing groups capable of forming complex metal compounds, for instance an aryl-ortho-hydroxy-carboxylic acid such as salicylic acid and on the other hand with middle components, as described.

Among the many other possibilities for making dyestuffs of the kind in question there may be mentioned the use of derivatives of 2-amino-5-hydroxynaphthalene-7-sulfonic acid preferably in the form of the corresponding dinaphthylamine compound or its N-acyl derivative, for instance the urea of 2-amino-5-hydroxynaphthalene-7-sulfonic acid, as the azo-component. Such compounds are for instance coupled with a diazo compound containing the radical of the hydroxyquinoline. In making urea derivatives the linking of the two amines with phosgene to form the urea may occur after the coupling. Quite generally it is also possible to introduce the hydroxyquinoline radical into the new dyestuff by means of a reaction other than a coupling reaction. Such reactions are in addition to the stated phosgenizing quite generally acylation, condensation with compounds containing active halogen atoms, for example with triazine derivatives, reduction of nitro-groups to azo- or azoxygroups, for example by the process described in U. S. A. patent applications Serial No. 148,414, filed June 15, 1937, and Serial No. 148,410, filed June 15, 1937 (corresponding to British Patents Nos. 491,551 and 497,350). In many cases it is of advantage to use components which impart enhanced affinity for vegetable fiber to the dyestuff, for instance 4:4-diaminodiphenyl derivatives, diaminostilbenedisulfonic acid, dehydrothiotoluidine, derivatives of 2-amino-5-hydroxynaphthalene sulfonic acid, components of highly condensed ring systems, for example carbazole derivatives, components containing

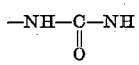

or —NH—CO-groups, like 4:4'-diaminodiphenyl ureas or 4-benzoylaniline.

The dyestuffs obtained owing to the presence of the hydroxyquinoline radical are capable of being metallized. This property can be enhanced when components are used which comprise lake-forming groups, that is to say groups which lead to favorable orientations of OH, $NH_2$, NH and COOH among themselves or in combination with the azo-groups. Such orientations are for example ortho-ortho'-oxyazo-, ortho-oxy-ortho'-aminoazo-, ortho-oxy-ortho'-carboxyazo and salicylic acid groups.

The orientations may be obtained by selecting diazo- and azo-components which produce these orientations or by converting in the finished azo-dyestuff halogen atoms, also O-alkyl-, O-acyl-groups or COO-alkyl groups into OH- or COOH-groups respectively, a change which may be carried out during the metallizing if desired.

Dyestuffs obtainable by this invention may be used for dyeing various materials, for example animal fibers like wool, silk or leather and particularly vegetable fibers, like cotton and linen or fibers from regenerated cellulose like artificial silk and staple fiber; they may also be used as pigment dyestuffs. Cellulosic fibers may be dyed by the dyestuffs by the direct dyeing processes, for example in a bath containing sodium sulfate and if desired sodium carbonate. By after-treating the dyeings with agents yielding metal in a fresh bath or in the bath that has been used for dyeing, dyeings of excellent properties of fastness may be obtained. As metal yielding agents metal salts may be used in known manner, especially copper salts, for instance copper sulfate. With advantage the processes described in U. S. A. Patent No. 2,148,659 and U. S. A. patent application Serial No. 116,038, filed December 15, 1936, (corresponding to British Patent No. 468,362) may be used and especially such metallizing agents may be used as are stable to alkalis, for instance agents made by the action of hydroxy-carboxylic acids on copper salts, the use of which is possible for example in the presence of alkali-carbonate or caustic alkali.

Especially valuable products are obtained in many cases if a metal yielding agent is caused to act on an azo-dyestuff obtainable by the invention. This treatment which may also follow in the dye-bath may occur in known manner in an acid, neutral or alkaline medium with or without a suitable addition, for instance a salt like common salt, a free organic acid or a salt thereof and in presence or absence of a suitable dispersing agent or solvent, for instance alcohol, glycerine or pyridine and in an open vessel or under pressure; as metal yielding agents various metal compounds are available, for example salts of iron, chromium, nickel, cobalt and especially copper.

The metalliferous azo-dyestuffs thus obtainable may be used for dyeing the various materials named above, very fast dyeings of various tints being obtained. If these complex metal compounds are sparingly soluble to insoluble, the process of U. S. A. Patent No. 2,092,429 may be used.

The following examples illustrate the invention, the parts being by weight:

*Example 1*

15.3 parts of 1-hydroxy-2-carboxy-4-aminobenzene are dissolved in 500 parts of water containing 25 parts of hydrochloric acid and are converted into the diazo compound by addition of 7 parts of sodium nitrite at 15° C. Into this mixture there are run 22.3 parts of 1-aminonaphthalene-7-sulfonic acid in the form of its ammonium salt dissolved in 200 parts of water. Within about 10 hours the amino-azo-compound separates in the form of a blackish precipitate and is filtered. It is now dissolved in 500 parts of water and 20 parts of caustic soda solution of 40° Bé. and converted into the diazonium compound by means of 50 parts of concentrated hydrochloric acid and 7 parts of sodium nitrite. There is then added another 22.3 parts of 1-naphthylamine-7-sulfonic acid or a corresponding quantity of 1-aminonaphthalene-6-sulfonic acid or of the commercial mixture of the two acids in the form of alkali salts dissolved in 200 parts of water. Any excess of free mineral acid which may be present is buffered by means of sodium acetate. After 10 hours coupling is complete. The blackish dyestuff is filtered and dissolved in 500 parts of water and 20 parts of caustic soda of 40° Bé. To this solution 7 parts of sodium nitrite and sufficient ice to produce a temperature of 4–6° C. are added. 50 parts of hydrochloric acid are then added and stirring is continued for some time until diazotization is completed. This diazonium compound is added to a solution of 14.5 parts of 8-hydroxyquinoline in 500 parts of water which contain 20 parts of caustic soda solution of 40° Bé. and 30 parts of anhydrous sodium carbonate. The blue trisazo-dyestuff is quickly formed as a black precipitate. It is filtered and dried. It is a black powder which corresponds to the formula

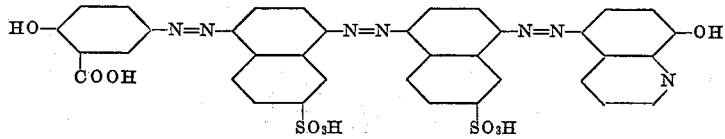

and is soluble in water and in dilute alkalis to a blue solution. When dyed in a bath containing sodium carbonate and sodium sulfate with this dyestuff vegetable fibers and fibers from regenerated cellulose are colored blue to navy-blue tints which on treatment with an agent yielding metal, especially a copper salt, acquire excellent fastness to washing and light.

*Example 2*

18.2 parts of 4:4'-diaminodiphenyl are tetrazotized in the usual manner and the tetrazo-compound is coupled in alkaline solution with 13.8 parts of 1-hydroxybenzene-2-carboxylic acid. When the tetrazo-compound has disappeared there is added a solution neutralized with sodium carbonate of 22.3 parts of 1-aminonaphthalene-6-sulfonic acid and the mass is acidified with acetic acid of 50 per cent strength. The coupling is conducted at first for 6 hours below 20° C. and finally for 12 hours while stirring at 25-30° C. The disazo-dyestuff is filtered and purified by reprecipitation from water.

This disazo-dyestuff is then dissolved in 2000 parts of water containing 10.6 parts of anhydrous sodium carbonate, 6.9 parts of sodium nitrite dissolved in 25 parts of water are added and the whole is acidified at 5° C. by means of 50 parts of concentrated hydrochloric acid. The diazotizing occupies about 12 hours and coupling at 10-15° C. with 16 parts of 8-hydroxyquinoline in a solution alkaline with sodium carbonate follows. At the end of this coupling the temperature is raised to 60° C. and the dyestuff is salted out and purified by reprecipitation from water.

When dry, the new trisazo-dyestuff of the formula

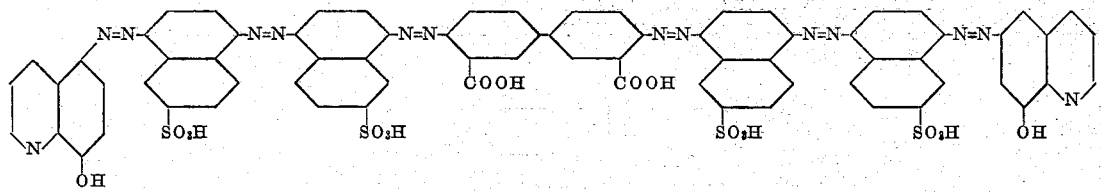

The purified dyestuff is again indirectly tetrazotized as described above. There is then added a solution of 30 parts of 8-hydroxyquinoline in hydrochloric acid solution and the mass is rendered alkaline by addition of sodium carbonate solution of 20 per cent strength. Coupling is continued for 20-60 hours at 10-15° C. The new dyestuff is filtered, if desired purified, and dried. It corresponds to the formula

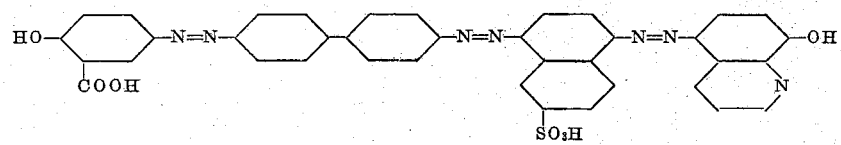

is a grey-black powder soluble in water to a brown-orange solution sparingly in sodium carbonate solution of 10 per cent strength and in caustic soda solution of 10 per cent strength to a brown-orange solution and in concentrated sulfuric acid to a blue solution. It dyes cotton brown tints which acquire good fastness to washing and light when after-treated with a copper salt.

It is a grey-black powder soluble in water, in sodium carbonate solution of 10 per cent strength and in caustic soda solution of 10 per cent strength to blackish-violet solutions and in concentrated sulfuric acid to a black-green solution. The new dyestuff dyes cotton grey tints which become very fast when after-treated with copper salt.

Example 4

15.4 parts of 5-nitro-2-amino-1-hydroxybenzene are diazotized and coupled in a solution alkaline with sodium carbonate with 24 parts of 2-amino-5-hydroxynaphthalene-7-sulfonic acid. When coupling is complete the dyestuff is filtered, washed with some dilute sodium chloride solution and then dissolved by the aid of 20 parts of caustic soda solution of 30 per cent strength in 1000 parts of luke-warm water. After addition of an aqueous solution of 6 parts of sodium nitrite the whole is allowed to run, while stirring well, into a mixture of ice and 58 parts of hydrochloric acid of 30 per cent strength. After the diazo suspension has been stirred for some hours it is coupled in a solution alkaline with sodium carbonate with a suspension of 13 parts of 8-hydroxyquinoline. When coupling is complete some sodium chloride is added and the dyestuff is filtered. The latter is now treated by the process described in U. S. A. patent application Serial No. 148,414, filed June 15, 1937, in an alkaline solution with dextrose. There is obtained a dyestuff of the formula

Example 3

27.2 parts of 4:4'-diaminodiphenyl-3:3'-dicarboxylic acid are tetrazotized in known manner and coupled in acetic acid solution with 47 parts of 1-aminonaphthalene-6-sulphonic acid. When coupling is complete the dyestuff is filtered and purified by reprecipitation from water.

The purified dyestuff paste is dissolved in dilute sodium carbonate solution, 13.8 parts of sodium nitrite are added and the mixture is acidified at 10° C. with hydrochloric acid of 15 per cent strength. Tetrazotizing is continued for 8-12 hours at 10-15° C. There is then added so much concentrated sodium acetate solution that the mineral acid reaction disappears; the solution is then coupled at 15-35° C. with the solution neutralized with sodium carbonate of 47 parts of 1-aminonaphthalene-7-sulfonic acid in 400 parts of water, the reaction being decidedly acid with acetic acid. The coupling occupies 2-3 days. The dyestuff formed is filtered and purified by reprecipitation from water.

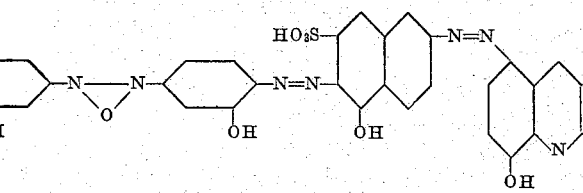

which dyes cotton a tint that when treated with copper salt becomes a blue-grey very fast to light and washing.

Example 5

15.4 parts of 5-nitro-2-amino-1-hydroxybenzene are diazotized in usual manner and coupled in a solution alkaline with sodium bicarbonate with 24 parts of 2-amino-5-hydroxynaphthalene - 7 - sulfonic acid. The resulting monoazo-dyestuff is filtered and washed with a 5 per cent solution of sodium chloride for removing the excess of coupling component. The filter paste is dissolved in 1000 parts of water by addition of 20 parts by volume of caustic soda solution of 30 per cent strength at about 40° C. an aqueous solution of 6.9 parts of sodium nitrite is added and the whole is added to a mixture of ice and 46 parts by volume of hydrochloric acid of 30 per cent strength while thoroughly stirring. After stirring for some hours while cooling with ice, a solution of 22.5 parts of 8-hydroxyquinoline-7-sulfonic acid and 30 parts of anhydrous sodium carbonate in 400 parts of water is added to this suspension of the diazo-azo-compound. The whole is stirred first in the cold and afterwards at room temperature. The disazo-dyestuff separates by addition of sodium chloride and is filtered.

The filter paste is suspended in 2400 parts of water, the suspension heated to 60° C. and 135 parts by volume of caustic soda solution of 30 per cent strength as well as a solution of 8 parts of grape sugar in 80 parts of water are added. The reaction mixture is stirred for about ½ hour at 55–60° C., 100 parts of sodium chloride are added and after cooling the dyestuff is filtered and dried.

The dyestuff of the probable formula

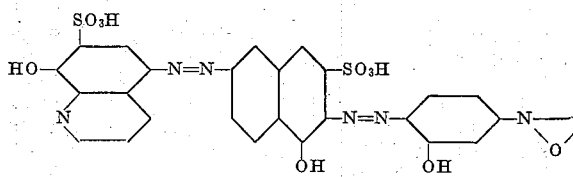
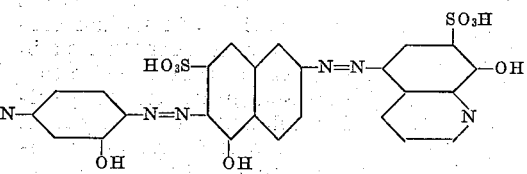

represents a blackish powder, soluble in water and in dilute alkalis to blue solutions, in concentrated sulfuric acid to a reddish blue solution and dyeing cotton from a dye-bath containing sodium sulfate grey shades which become very fast when treated with copper sulfate.

*Example 6*

27.2 parts of 4:4'-diaminodiphenyl-3:3'-dicarboxylic acid are tetrazotized in usual manner and coupled with 14.5 parts of 1-hydroxybenzene-2-carboxylic acid in a solution alkaline with sodium carbonate. After all of the tetrazo compound has disappeared there is added a solution of 25.6 parts of 2-amino-5-hydroxynaphthalene-7-sulfonic acid which has been neutralized with sodium carbonate, and coupling is effected at 10–15° C. The resulting disazo-dyestuff is separated by adding sodium chloride and washed with a dilute solution of sodium chloride.

This disazo-dyestuff is dissolved in 700 parts of water at 60–70° C., a solution of 7.2 parts of sodium nitrite in 36 parts of water is added and after cooling to 0–5° C. the mixture is acidified by means of 80 parts by volume of concentrated hydrochloric acid which has been diluted with an equal volume of water. Diazotization lasts about 12 to 16 hours. This diazo-compound is coupled with 15 parts of 8-hydroxyquinoline in a solution alkaline with sodium carbonate. The trisazo-dyestuff is separated on addition of sodium chloride and, if necessary, purified by dissolving in water and adding sodium chloride. It is filtered and dried.

This trisazo-dyestuff of the formula

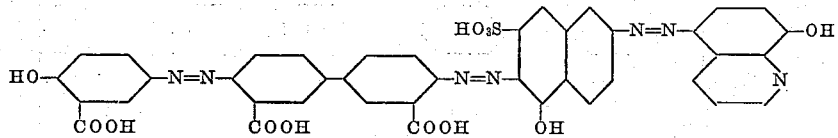

is a grey-black powder soluble in water to a violet solution, in sodium carbonate solution of 10 per cent strength to a reddish blue solution, in caustic soda solution of 10 per cent strength to a reddish violet solution and in concentrated sulfuric acid to a blue solution. It dyes cotton by the usual methods of after-treating with copper salts in the dye-bath or in a fresh bath fast violet-blue shades.

*Example 7*

18.4 parts of 4:4'-diaminodiphenyl are tetrazotized in usual manner and coupled with 14.5 parts of 1-hydroxybenzene-2-carboxylic acid in a solution alkaline with sodium carbonate at 6–10° C. After the tetrazo compound has disappeared there is added a solution of 26 parts of 1-amino-2-methoxynaphthalene-6-sulfonic acid, which has been neutralized with sodium carbonate, the reaction mixture is acidified with acetic acid and coupling is effected at 15–30° C. during 16–20 hours. The disazo-dyestuff is filtered without addition of salt and washed with water.

The filter paste is suspended in 800 parts of water and dissolved at 70–80° C. by addition of 10.6 parts of anhydrous sodium carbonate. 7.2 parts of sodium nitrite are then added, the whole is cooled to 0–5° C. and acidified with a mixture of 30 parts of water and 50 parts by volume of concentrated hydrochloric acid. Diazotization lasts about 12–16 hours. The diazo-compound is then coupled with 15 parts of 8-hydroxyquinoline at 10–15° C. in a solution alkaline with sodium carbonate. When coupling is finished, the reaction mixture is heated to 60° C. and the dyestuff is separated by addition of sodium chloride.

When dry, the new trisazo-dyestuff represents a grey-black powder soluble in water to a brown-olive solution, in sodium carbonate solution of 10 per cent strength and in caustic soda solution of 10 per cent strength to a brown solution, and in concentrated sulfuric acid to a blackish violet solution. It corresponds to the formula

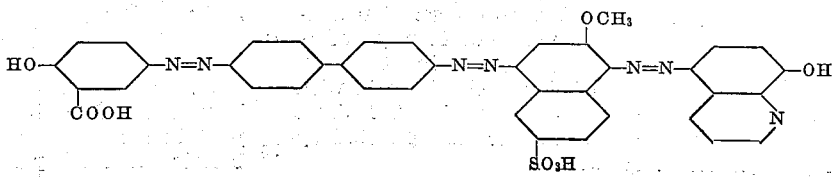

When treated with copper salts in the dye-bath or in a fresh bath it dyes cotton fast blackish brown shades.

*Example 8*

18.4 parts of 4:4'-diaminodiphenyl are tetrazotized in usual manner and coupled with 14.5 parts of 1-hydroxybenzene-2-carboxylic acid in a solution alkaline with sodium carbonate at 6–10° C. When the tetrazo compound has disappeared coupling is effected with 22.5 parts of 1-aminonaphthalene-6-sulfonic acid in acetic acid solution at 15–30° C. The disazo-dyestuff is filtered without addition of salt and washed with water.

This dyestuff is dissolved in 800 parts of water and 10.6 parts of anhydrous sodium carbonate at 70–80° C., a solution of 7.2 parts of sodium nitrite in 36 parts of water is added and after cooling to 0–5° C. the mixture is acidified with a mixture of 50 parts by volume of concentrated hydrochloric acid and 50 parts of water. Diazotization lasts 16–20 hours. The diazo-compound is then coupled with 23.6 parts of 8-hydroxyquinoline-7-sulfonic acid at 10–15° C. in a solution alkaline with sodium carbonate. When coupling is complete the dyestuff is precipitated by addition of sodium chloride.

When dry, the new trisazo-dyestuff of the formula

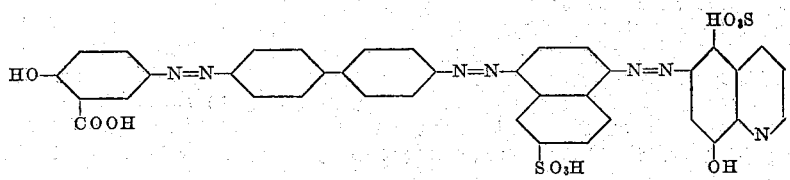

represents a grey-black powder soluble in water and in sodium carbonate solution of 10 per cent strength to a brown solution, in caustic soda solution of 10 per cent strength to a reddish-brown solution and in concentrated sulfuric acid to a black-blue solution. When treated with copper salts in the dye-bath or in a fresh bath it dyes cotton fast red-brown tints.

*Example 9*

18.4 parts of 4:4'-diaminodiphenyl are tetrazotized in usual manner and coupled with 14.5 parts of 1-hydroxy-benzene-2-carboxylic acid in a solution alkaline with sodium carbonate at 6–10° C. As soon as the tetrazo solution has disappeared there is added a solution of 22.5 parts of 1-aminonaphthalene-6-sulfonic acid neutralized with sodium carbonate and the reaction mass is acidified with acetic acid of 50 per cent strength. The coupling lasts about 16 hours at 15–30° C. The disazo-dyestuff is filtered without addition of salt and washed with water.

This dyestuff is dissolved in 800 parts of water and 10.6 parts of anhydrous sodium carbonate at 70–80° C., a sodium nitrite solution corresponding to 7.2 parts of NaNO2 is added and after cooling to 0–5° C. the mixture is acidified with a mixture of 50 parts by volume of concentrated hydrochloric acid and 50 parts of water. Diazotization lasts as a rule 16–20 hours. The diazo-compound is then coupled with 23.6 parts of 8-hydroxyquinoline-5-sulfonic acid at 10–15° C. in a solution alkaline with sodium carbonate. When coupling is complete the dyestuff is precipitated by addition of sodium chloride.

When dry, the new trisazo-dyestuff of the formula

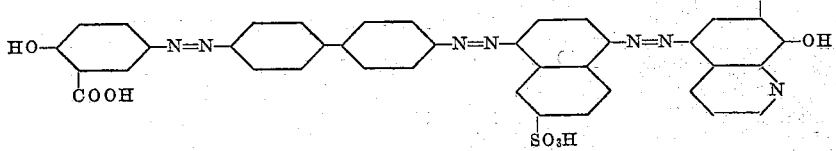

represents a grey-black powder soluble in water, in sodium carbonate solution of 10 per cent strength and in caustic soda solution of 10 per cent strength to a brown solution, and in concentrated sulfuric acid to a blackish blue-violet solution. When treated with copper salts in the dye-bath or in a fresh bath it dyes cotton fast red-brown tints.

*Example 10*

8.3 parts of the sodium salt of the dyestuff produced according to Example 3 are dissolved in 500 parts of hot water, the solution is mixed with 2 parts of crystallized sodium acetate and after addition of 30 parts of a copper sulfate solution of 10 per cent strength the whole is stirred for about ½ hour at 90–95° C. The precipitated dyestuff is filtered and dried; it is a dark powder soluble in dilute sodium carbonate solution to a grey solution and dyeing cotton in a bath containing Glauber's salt grey shades.

Instead of the dyestuff of Example 3 equivalent amounts of any of the dyestuffs of the preceding examples may be used. Instead of copper sulfate other copper salts as well as salts of other metals, for instance cobalt or iron, may be used.

*Example 11*

Into a dye-bath of 3000 parts of water containing 1.5 parts of the dyestuff obtainable as described in Example 3 as well as 2 parts of anhydrous sodium carbonate there are entered at 50° C. 100 parts of cotton; the temperature is raised to 90° C. and there are added after ¼ hour 30 parts of crystallized sodium sulfate, whereupon the dyeing is continued for ¾ hour at 90–95° C. The goods are then rinsed and treated in a fresh bath containing 3 parts of crystallized copper sulfate and 1 part of acetic acid of 40 per cent strength at 70–80° C. for ½ hour. They are then rinsed as usual and if desired soaped for a short time and finished. The cotton is dyed fast grey-blue tints.

*Example 12*

Into a dye-bath of 2500 parts of water containing 1 part of the dyestuff obtainable as described in Example 1, and 3 parts of anhydrous sodium carbonate there are introduced at 40° C. 100 parts of cotton; the bath is raised to the boil within a ¼ hour, 30 parts of crystallized sodium sulfate are added and dyeing is continued for 1 hour at 90° C. There is then added the solution which has been made from 1.5 parts of crystallized copper sulfate, 2.5 parts of tartaric acid, 100 parts of water and so much caustic soda solution that the solution reacts neutral. Dyeing is continued for ¾ hour at 90° C. and the goods are rinsed and dried as usual. Cotton is dyed fast blue tints.

What we claim is:

1. Azo-dyestuffs built up from components selected from the group consisting of components of the benzene, naphthalene, triazine, dehydrothiotoluidine and carbazole series containing at least 3 azo-groups and at least one radical of a binuclear compound having the grouping

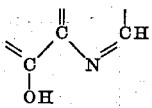

typical for 8-hydroxyquinoline.

2. Azo-dyestuffs built up from components selected from the group consisting of components of the benzene, naphthalene, triazine, dehydrothiotoluidine and carbazole series containing at least 3 azo-groups, further at least one salicylic acid grouping and finally at least one radical of a binuclear compound having the grouping

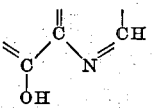

typical for 8-hydroxyquinoline.

3. Azo-dyestuffs of the general formula

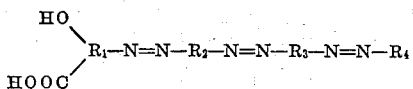

wherein $R_1$ stands for a benzene radical carrying the hydroxyl and carboxyl groups in ortho-position to each other, $R_2$ and $R_3$ stand for any aryl radicals and $R_4$ stands for a radical of a binuclear compound having the grouping

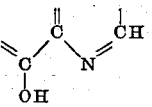

typical for 8-hydroxyquinoline.

4. Azo-dyestuffs of the general formula

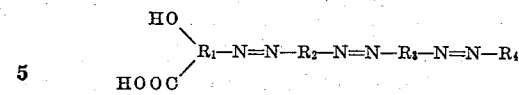

wherein $R_1$ stands for a benzene radical carrying the hydroxyl and carboxyl groups in ortho-position to each other, $R_2$ stands for a diphenyl radical, $R_3$ stands for a naphthalene radical and $R_4$ stands for a radical of a binuclear compound having the grouping

typical for 8-hydroxyquinoline.

5. Azo-dyestuffs built up from components selected from the group consisting of components of the benzene, naphthalene, triazine, dehydrothiotoluidine and carbazole series containing at least 3 azo-groups and 2 radicals of a binuclear compound having the grouping

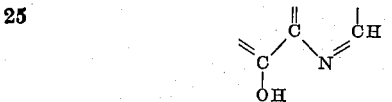

typical for 8-hydroxyquinoline.

6. Symmetrical azo-dyestuffs containing as neutral grouping a member of the group consisting of —N=N— and

and in each half of the molecule the grouping

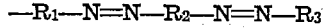

wherein $R_1$ stands for a benzene, radical, $R_2$ stands for a naphthalene radical and $R_3$ stands for a radical of binuclear compound having the grouping

typical for 8-hydroxyquinoline.

7. The azo-dyestuff of the formula

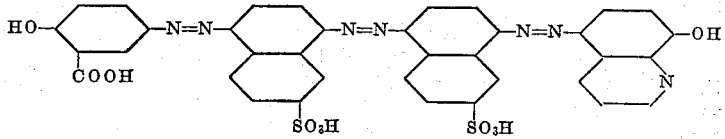

8. The azo-dyestuffs of the formula

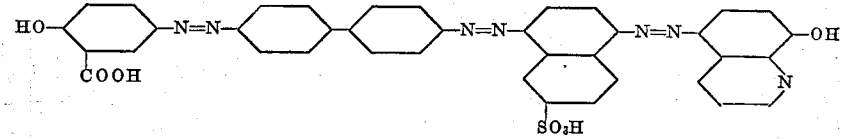

9. The azo-dyestuffs of the general formula

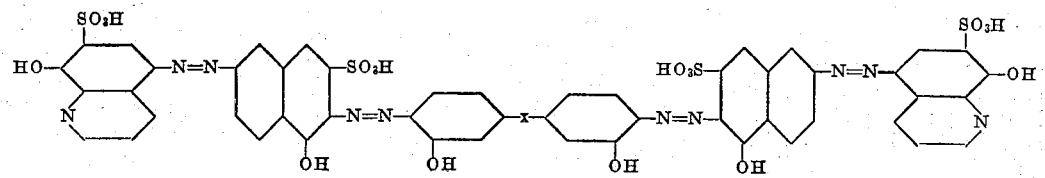

wherein x stands for a member of the group consisting of —N=N— and $$-N\underset{O}{\overset{}{\diagdown\diagup}}N-$$

10. Process for the manufacture of azo-dyestuffs containing at least 3 azo-groups, comprising uniting diazo-azo-compounds containing at least 2 azo-groups built up from components selected from the group consisting of components of the benzene, naphthalene, triazine, dehydrothiotoluidine and carbazole series with binuclear compounds capable of coupling having the grouping typical for 8-hydroxyquinoline.

11. Process for the manufacture of azo-dyestuffs containing at least 3 azo-groups, comprising uniting diazo-azo-compounds containing at least 2 azo-groups and at least one salicylic acid radical built up from components selected from the group consisting of components of the benzene, naphthalene, triazine, dehydrothiotoluidine and carbazole series with binuclear compounds capable of coupling having the grouping typical for 8-hydroxyquinoline.

12. Process for the manufacture of trisazodyestuffs, comprising uniting compounds of the general formula $$\underset{HOOC}{\overset{HO}{\diagdown}}R_1-N=N-R_2-N=N-R_3-D$$

wherein $R_1$ is a benzene nucleus containing the hydroxyl and carboxyl groups in ortho-position to each other, $R_2$ and $R_3$ are aryl nuclei and D is a diazonium group, with binuclear compounds capable of coupling having the grouping typical for 8-hydroxyquinoline.

13. Process for the manufacture of a trisazodyestuff, comprising uniting the diazo-compound of the formula HO—⟨ ⟩—N=N—⟨⟨ ⟩⟩—N=N—⟨ ⟩—D
   |                |              |
   COOH            SO₃H           SO₃H wherein D is a diazonium group, with 8-hydroxyquinoline.

14. Process for the manufacture of a trisazodyestuff, comprising uniting the diazo-compound of the formula HO—⟨ ⟩—N=N—⟨ ⟩⟨ ⟩—N=N—⟨⟨ ⟩⟩—D
   |                              |
   COOH                          SO₃H wherein D is a diazonium group, with 8-hydroxyquinoline.

15. Process for the manufacture of azo-dyestuffs containing at least 4 azo-groups, comprising reducing azo-dyestuffs built up from components selected from the group consisting of components of the benzene, naphthalene, triazine, dehydrothiotoluidine and carbazole series containing at least 2 azo-groups and one nitrogroup and the radical of a binuclear compound having the grouping typical for 8-hydroxyquinoline, with reducing agents in such a manner that the nitro-group is converted into such a reduction stage which links two radicals of the dyestuff by a member of ahe group consisting of —N=N— and $$-N\underset{O}{\overset{}{\diagdown\diagup}}N-$$

16. Process for the manufacture of azo-dyestuffs, comprising reducing disazo-dyestuffs of the general formula $$NO_2-R_1-N=N-R_2-N=N-R_3$$

wherein $R_1$ is a benzene radical in which the nitro- and azo-groups are in para-position to each other, $R_2$ is a naphthalene radical and $R_3$ is the radical of a compound having the grouping typical for 8-hydroxyquinoline, with reducing agents in such a manner that the nitro-group is converted into such a reduction stage which links two radicals of the dyestuff by a member of the group consisting of —N=N— and $$-N\underset{O}{\overset{}{\diagdown\diagup}}N-$$

17. Process for the manufacture of azo-dyestuffs, comprising reducing the azo-dyestuff of the formula with grape sugar in an alkaline medium.

FRITZ STRAUB.
PETER PIETH.
WALTER ANDERAU.
WALTER HANHART.